US00RE47309E

(19) United States
(12) Reissued Patent
Spero et al.

(10) Patent Number: US RE47,309 E
(45) Date of Reissued Patent: Mar. 19, 2019

(54) SYSTEM AND METHOD FOR CAPTURE, STORAGE AND PROCESSING OF RECEIPTS AND RELATED DATA

(71) Applicant: The Neat Company, Inc., Philadelphia, PA (US)

(72) Inventors: Raphael Spero, Merion Station, PA (US); Leslie Spero, Merion Station, PA (US)

(73) Assignee: THE NEAT COMPANY, INC., Philadelphia, PA (US)

(21) Appl. No.: 15/625,568

(22) Filed: Jun. 16, 2017

Related U.S. Patent Documents

Reissue of:

(64) Patent No.: 7,069,240
Issued: Jun. 27, 2006
Appl. No.: 10/690,309
Filed: Oct. 21, 2003

U.S. Applications:

(60) Provisional application No. 60/420,471, filed on Oct. 21, 2002, provisional application No. 60/459,810, filed on Apr. 2, 2003.

(51) Int. Cl.
*G07B 17/00* (2006.01)
*G07F 19/00* (2006.01)
(Continued)

(52) U.S. Cl.
CPC ..... *G06Q 40/02* (2013.01); *G06Q 20/20* (2013.01); *G06Q 30/0609* (2013.01); *G06Q 40/12* (2013.12)

(58) Field of Classification Search
CPC ..... G06Q 40/02; G06Q 40/12; G06Q 20/20; G06Q 30/0609
See application file for complete search history.

(56) References Cited

U.S. PATENT DOCUMENTS 5,091,968 A * 2/1992 Higgins et al. ..... 382/220
5,159,548 A * 10/1992 Caslavka ..... 705/45
(Continued)

FOREIGN PATENT DOCUMENTS

CN 1277694 A 12/2000
CN 1711541 A 12/2005
(Continued)

OTHER PUBLICATIONS

"U.S. Appl. No. 10/690,309, Final Office Action dated May 19, 2005", 8 pgs.
(Continued)

*Primary Examiner* — Jeffrey D Carlson
(74) *Attorney, Agent, or Firm* — Schwegman Lundberg & Woessner, P.A.

(57) ABSTRACT

The present invention is a system comprising image capture device, such as a scanner or digital camera connected to a computer processor that is able to capture and store images, and method of using the same for storing and processing expense receipts. The computer processor analyzes the images of the receipts, converts the images to text, analyzes the data, extracts expense data, and puts the data into an expense report. The end user can review the captured expense data, correct it or add to it. Preferably, the system displays the image of the receipt side-by-side with the captured expense data to make review and editing easier. In a preferred embodiment the image capture device is portable, such as a handheld scanner or digital camera, so that a user can scan receipts while traveling and discard the receipt. Also, in a preferred embodiment, the images are
(Continued)

encrypted to prevent tampering by the user or a third party, and thereby preserve the integrity of the receipt image. In one preferred embodiment, receipt images or uploaded via the Internet an intranet, or other network to a remote data storage facility to further protect the images, both from tampering and from loss.

30 Claims, 6 Drawing Sheets

(51) Int. Cl.

| | |
|---|---|
| ***G06Q 40/02*** | (2012.01) |
| ***G06Q 20/20*** | (2012.01) |
| ***G06Q 30/06*** | (2012.01) |
| ***G06Q 40/00*** | (2012.01) |

(56) References Cited

U.S. PATENT DOCUMENTS

| | | | | |
|---|---|---|---|---|
| 5,751,842 | A * | 5/1998 | Riach et al. | 382/137 |
| 5,897,625 | A | 4/1999 | Gustin et al. | |
| 5,910,988 | A * | 6/1999 | Ballard | 505/75 |
| 5,920,877 | A | 7/1999 | Kolster | |
| 5,926,550 | A | 7/1999 | Davis | 380/25 |
| 5,963,925 | A * | 10/1999 | Kolling et al. | 705/40 |
| 5,969,324 | A | 10/1999 | Reber et al. | 235/462.13 |
| 6,009,408 | A * | 12/1999 | Buchanan | 705/11 |
| 6,029,144 | A * | 2/2000 | Barrett et al. | G06Q 99/00 235/375 |
| 6,054,707 | A | 4/2000 | Hou | 250/234 |
| 6,192,165 | B1 | 2/2001 | Irons | 382/306 |
| 6,205,435 | B1 | 3/2001 | Biffar | |
| 6,367,013 | B1 | 4/2002 | Bisbee et al. | 713/178 |
| 6,397,194 | B1 | 5/2002 | Houvener et al. | 705/16 |
| 6,459,506 | B1 | 10/2002 | Hu et al. | 358/473 |
| 6,603,864 | B1 | 8/2003 | Matsunoshita | |
| 6,683,697 | B1 | 1/2004 | Lech et al. | |
| 7,069,240 | B2 | 6/2006 | Spero et al. | |
| 7,746,510 | B2 * | 6/2010 | Pandipati | G06Q 40/00 235/375 |
| 2002/0101626 | A1 | 8/2002 | Pandipati | |
| 2002/0118379 | A1 | 8/2002 | Chakraborty et al. | |
| 2003/0046093 | A1 * | 3/2003 | Erickson et al. | 705/1 |
| 2003/0083966 | A1 * | 5/2003 | Treibach-Heck et al. | 705/32 |

FOREIGN PATENT DOCUMENTS

| | | | |
|---|---|---|---|
| CN | 103714481 | A | 4/2014 |
| JP | 08161436 | A | 6/1996 |
| JP | 10271253 | A | 10/1998 |
| JP | 410271253 | * | 10/1998 |
| JP | 2006511896 | A | 4/2006 |
| WO | WO-0177937 | A1 | 10/2001 |
| WO | WO 2004055725 | | 7/2004 |

OTHER PUBLICATIONS

"U.S. Appl. No. 10/690,309, Non Final Office Action dated Sep. 27, 2004", 7 pgs.
"U.S. Appl. No. 10/690,309, Notice of Allowance dated Mar. 8, 2016", 12 pgs.
"U.S. Appl. No. 10/690,309, Response filed Feb. 25, 2005 to Non Final Office Action dated Sep. 27, 2004", 20 pgs.
"U.S. Appl. No. 10/690,309, Response filed Aug. 17, 2005 to Final Office Action dated May, 19, 2005", 14 pgs.
"U.S. Appl. No. 90/013,668, Advisory Action dated Sep. 14, 2016", 5 pgs.
"U.S. Appl. No. 90/013,668, Advisory Action dated Oct. 24, 2016", 4 pgs.
"U.S. Appl. No. 90/013,668, Appeal Brief filed Dec. 14, 2016", 26 pgs.
"U.S. Appl. No. 90/013,668, Appeal Decision dated 11-03-17", 17 pgs.
"U.S. Appl. No. 90/013,668, Decision on Request dated Feb. 1, 2016", 17 pgs.
"U.S. Appl. No. 90/013,668, Examiner Interview Summary dated Jan. 13, 2016", 3 pgs.
"U.S. Appl. No. 90/013,668, Examiner Interview Summary dated Aug. 31, 2016", 4 pgs.
"U.S. Appl. No. 90/013,668, Examiner's Answer to Appeal Brief dated Jan. 26, 2017", 16 pgs.
"U.S. Appl. No. 90/013,668, Final Office Action dated Jun. 30, 2016", 12 pgs.
"U.S. Appl. No. 90/013,668, Non Final Office Action dated Apr. 19, 2016", 10 pgs.
"U.S. Appl. No. 90/013,668, Reply Brief filed Mar. 27, 2017", 9 pgs.
"U.S. Appl. No. 90/013,668, Response filed Jun. 16, 2016 to Non Final Office Action dated Apr. 19, 2016", 22 pgs.
"U.S. Appl. No. 90/013,668, Response filed Aug. 30, 2016 to Final Office Action dated Jun. 30, 2016", 35 pgs.
"U.S. Appl. No. 90/013,668, Response filed Oct. 5, 2016 to Advisory Action dated Sep. 14, 2016", 41 pgs.
"Canadian Application Serial No, 2,502,811, Examiner's Rule 30(2) Requisition dated Jul. 5, 2018", 9 pgs.
"Canadian Application Serial No. 2,502,811, Office Action dated Apr. 15, 2014", 5 pgs.
"Canadian Application Serial No. 2,502,811, Office Action dated Jun. 28, 2017", 10 pgs.
"Canadian Application Serial No. 2,502,811, Office Action mailed Jul. 12, 2016", 9 pgs.
"Canadian Application Serial No. 2,502,811, Office Action dated Aug. 3, 2015", 8 pgs.
"Canadian Application Serial No. 2,502,811, Office Action dated Dec. 1, 2011", 3 pgs.
"Canadian Application Serial No. 2,502,811, Response filed Jan. 11, 2017 to Office Action dated Jul. 12, 2016", 10 pgs.
"Canadian Application Serial No. 2,502,811, Response filed Jan. 29, 2016 to Office Action dated Aug. 3, 2015", 11 pgs.
"Canadian Application Serial No. 2,502,811, Response filed Jun. 1, 2012 to Office Action dated Dec. 1, 2011", 17 pgs.
"Canadian Application Serial No. 2,502,811, Response filed Oct. 15, 2014 to Office Action dated Apr. 14, 2014", 23 pgs.
"Canadian Application Serial No. 2,502,811, Response filed Dec. 21, 2017 to Office Action dated Jun. 28, 2017", 28 pgs.
"Chinese Application Serial No. 200380103061.0, Office Action dated Jun. 9, 2010", 4 pgs.
"Chinese Application Serial No. 201310356478.3, Decision of Reexamination dated Mar. 30, 2018", 13 pgs.
"Chinese Application Serial No. 201310356478.3, Notice of Amendment dated Nov. 13, 2013".
"Chinese Application Serial No. 201310356478.3, Notice of Reexamination dated Aug. 17, 2017", 16 pgs.
"Chinese Application Serial No. 201310356478.3, Office Action dated May 3, 2016", 17 pgs.
"Chinese Application Serial No. 201310356478.3, Response filed Oct. 27, 2017 to Notice of Reexamination dated Aug. 17, 2017", 4 pgs.
"International Application Serial No. PCT/US2003/033398, International Search Report dated Dec. 9, 2004", 1 pg.
"Japanese Application Serial No. 2005-508298, Amendment filed Oct. 30, 2009", 10 pgs.
"Japanese Application Serial No. 2005-508298, Office Action dated Jun. 21, 2010", 3 pgs.
"Oracle Internet Expenses, Implementation and Administration Guide", Release 11i, Second Generation, (Sep. 2001), 220.
"Original Prosecution History File of U.S. Appl. No. 10/690,309".
"Reexamination Prosecution History File of U.S. Pat. No. 7,069,240".
"The American Heritage College Dictionary", 4th ed, (2004), p. 1013.
MacAuley, Irene Foster, et al., "The time is right for STP in insurance", Wall Street & Technology v18n7 PP: A18, (Jul 2000).

* cited by examiner

SYSTEM AND METHOD FOR CAPTURE, STORAGE AND PROCESSING OF RECEIPTS AND RELATED DATA

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

The present application claims the benefit of U.S. Provisional Application No. 60/420,471 filed on Oct. 21, 2002 and U.S. Provisional Application No. 60/459,810 filed on Apr. 2, 2003, which are incorporated herein in their entirety.

BACKGROUND OF THE INVENTION

Most commerce transactions entail a vendor creating a receipt for a purchaser. Many times these receipts are lost, torn, or faded from too much exposure, or are discarded. These receipts are often required or desired to be kept in acceptable condition for a variety of business and personal reasons.

Providers of receipts have attempted to address some of the problems presented by paper receipts. The use of computing technology speeds the preparation and payment of the bill, at which time a receipt can be quickly printed. It is also possible to have receipts mailed to an address specified by the traveler, obviating the need for the traveler to carry the receipt. These methods, however, are merely attempts to get a paper receipt to the traveler more quickly or conveniently and do not address the problems inherent in paper receipts.

Business professionals or corporations require receipts for the purpose of reimbursement from their own company or another company (client) that is paying for their services and expenses. Small business owners require receipts as proof to the IRS of purchases made on behalf of their business and for reimbursement purposes as described above. Individuals require receipts as proof of purchase in case they want to return items they purchased to a vendor in exchange for other monies or goods, or to partake in rebates or warranties. Individuals also desire receipts for budgetary reasons in order to track cash and credit expenditures.

In almost all organizations, the reimbursement process can be quite laborious and time consuming. Original receipts need to be photocopied several times in case the originals are lost. Copies are sent to various controllers and in some cases organization(s) that are sponsoring the services and expenses. Because receipts come in various sizes, photocopying receipts can be cumbersome and difficult. After the receipts are photocopied, individuals often need to fill out detailed expense reports matching each receipt to a specific expense line item. In a number of instances, receipts must be physically attached (taped or stapled) to a blank sheet of paper before the original receipts and expense reports are sent to the appropriate parties involved. Business professionals must also deal with digital receipts from airlines and in some cases hotels. This often requires opening an email, printing the receipts, and then attaching the receipt to a blank piece of paper. Controllers who review the expense report spend significant time ensuring that expense items claimed on the expense report can be verified by the actual receipt.

Small business owners require receipts as proof to the IRS of purchases made on behalf of their business and for reimbursement purposes. Most small business owners spend significant amount of time organizing and preparing business expenses for tax purposes. Time constraints and lack of organization make it difficult to easily prepare business expenditures for tax purposes. Numerous small business owners "wait until the last minute" to organize and submit taxes. Small business owners must also create detailed expense reports as described above, and attach their receipts according to their clients' procedures.

Individuals desire to keep their receipts in case they want to return or exchange an item they purchased from a vendor. Often, the receipts are misplaced, lost or damaged, thereby making it difficult to return the item. Individuals also desire to keep their receipts in order to claim special rebates or warranties. Individuals are usually required to send original receipts as proof of purchase to the manufacturer or sponsor of a promotion. Individuals also like to collect receipts in order to keep track of cash and credit expenditures for budgetary purposes.

In addition to storage of receipts, one of the most onerous tasks faced by business people is the generation and reconciliation of expense reports. An expense report is often necessary to receive reimbursement for travel or other expenses. Expense report is used herein broadly, and meant to include any type of report or recordkeeping for tracking expenses, including IRS required recordkeeping. Today, each receipt must be manually entered into the expense report, even if the report is done electronically on computer. Many receipts require multiple expense report entries. Expense report is also meant to include a list of receipts.

A number of systems exist that allow a user to scan, organize and store expense reports in electronic format. Computer systems also exist that allow users to electronically enter expense reports for reimbursement or tax purposes. However, users of such systems are still required to manually enter receipt data into their expense reports.

A system therefore is needed that will both scan the expense receipts and capture the data on the expense receipts and enter that data into the expense report.

BRIEF SUMMARY OF THE INVENTION

The present invention is a system comprising image capture device, such as a scanner or digital camera connected to a computer processor (CPU) that is able to capture and store images, and a method of using the same for storing and processing expense receipts. The computer processor analyzes the images of the receipts, converts the images to text, analyzes the text, extracts expense data, and puts the data into an expense report. The end user can review the captured expense data, correct it or add to it. Preferably, the system displays the image of the receipt side-by-side with the captured expense data to make review and editing easier.

In a preferred embodiment the image capture device is portable, such as a handheld scanner or digital camera, so that a user can scan receipts while traveling and discard the receipt.

Also, in a preferred embodiment, the images are encrypted to prevent tampering by the user or a third party, and thereby preserve the integrity of the receipt image.

In one preferred embodiment, receipt images are uploaded via the Internet, an intranet, or other network, to a remote data storage facility to further protect the images, both from tampering and from loss.

BRIEF DESCRIPTION OF THE SEVERAL VIEWS OF THE DRAWING

The foregoing summary, as well as the following detailed description of preferred embodiments of the invention, will be better understood when read in conjunction with the appended drawings. For the purpose of illustrating the invention, there is shown in the drawing an exemplary embodiment. It should be understood, however, that the invention is not limited to the precise arrangements and instrumentalities shown.

In the drawings.

DETAILED DESCRIPTION OF THE INVENTION

Figure 1:
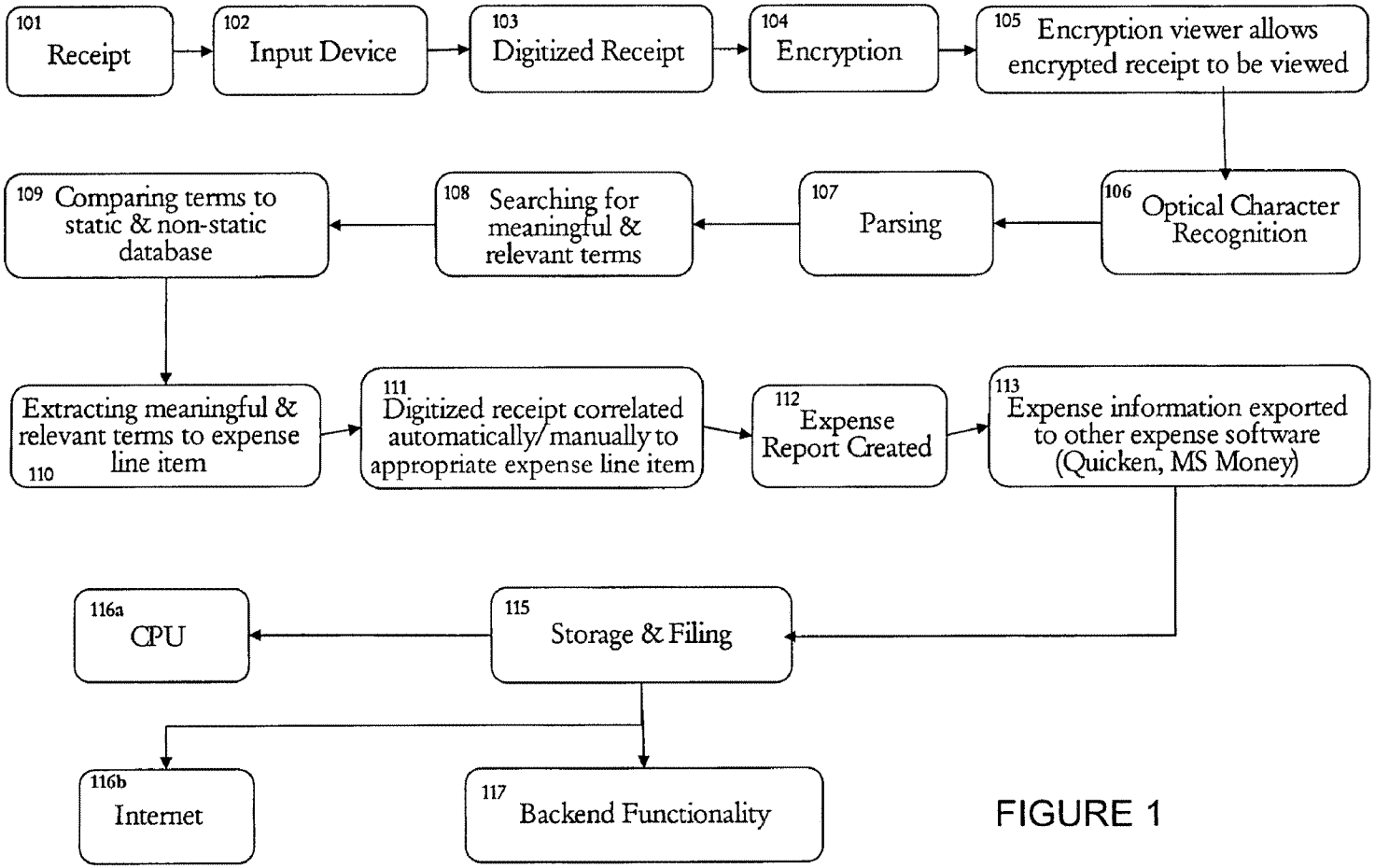
FIG. 1 is a is a functional block diagram illustrating a conceptual overview of the present invention.

FIG. 1 is a block diagram of the present invention. The process begins with a paper expense receipt 101. Such expense receipts are typically printed by a cash register or other point of sale device by merchants. Through an input device 102 an image of the receipt is created electronically and digitized 103.

Many types of receipt image input devices are possible. In one embodiment the input device is a flatbed scanner connected to a desktop computer. In another embodiment the input device may be a high speed scanner scanning many images for a corporation. In another embodiment the input device is a facsimile machine. In this embodiment a user can be provided with a fax number with which to fax his or her receipts while he is traveling and the digitized image of the fax can be stored instead of, or in addition to, printing it to paper. In the preferred embodiment the input device is portable such as a digital camera or portable scanner. Although not a limitation of the invention, the inventors have found that preferably, a digital camera would have a resolution of at least 300 dpi, or approximately 2 megapixels for a receipt of typical size. With image enhancement software lower resolution may be used as well. Such a digital camera need not be a stand alone camera, but will preferably be integrated into another device the users are likely to carry such as a cell phone, personal digital assistant (PDA) or communicator (i.e. combination PDA/cell phone).

Where a portable input device is used, the device will preferably have a display screen as well, so that the user can review the captured receipt image to ensure that an adequate image of the receipt has been captured. The input device may also use some form of removable storage such as a memory card or small hard drive. The portable device, in the preferred embodiment will also connect wirelessly through wireless telephone or wireless Internet access to a remote means of storing the image, thus being able to off-load the image during travel. In another embodiment the portable device may connect through standard telephone lines, or internet access lines, such as those found commonly in hotel rooms, to a remote computer for the offloading of captured receipt images.

While the embodiments discussed above use scanners or digital cameras as an input device, the invention is meant to encompass any method of taking an image of a paper receipt and turning it into a electronic digital format, whether now known or hereinafter invented.

In the preferred embodiment the input devices also time stamps the date and time which the receipt image was captured. This is also of great assistance in preventing fraud.

The system can handle a plurality of receipts and preferably should allow for separate items from a single receipt to be included on different expense reports.

Once the image has been captured it is transferred to a computer for processing. The terms computer, CPU and computer processor are meant to be used broadly as any microprocessor based computing device capable of processing digital information and need not be a separate device from the receipt image input device. The computer may be a server a desktop computer, a server, a laptop computer, a PDA, a communicator, a telephone, a digital camera or any other computing device now know or hereinafter invented.

The user can save the expense report with the digitized receipts attached to each line item or save the digitized receipts in a batch or individually file them to the CPU or Internet host. The expense report can be viewed with the digitized receipt next to the appropriate expense line item. This will speed up the process of verifying that expense line item is accurate and correct. The user may also print the receipts 1, 3 or 6 per page displaying the descriptive information that the user previously attached.

The user may also manually attach descriptive information to the receipt either on a CPU or the Internet, or through the input device (such as a PDA). For example, expense category, amount of expense, date of transaction, client sponsoring expense, name of vendor, or vendor address. The user may also attach personal descriptive text to each receipt. Any information attached to the receipt will preferably follow the receipt image in an electronic fashion.

A preferred aspect of this invention includes encryption of the scanned receipt image 104. Encryption may be performed by either the input device or the computer but it is preferable that it be performed as early as possible in the process to prevent any tampering with the image. In one embodiment the software uses a proprietary encryption methodology that can only be subsequently viewed by a compatible viewer 105. This viewer does not include any editing capabilities, thus preventing the receipts from being changed. Such a system is preferable to using other standard formats such as tiff, giff or pdf for which standard editors commonly exist. Of course, other encryption techniques using public or private key techniques, whether now known or hereinafter invested may be used with the system. The foregoing is not meant to preclude embodiments of the invention which use standard file formats and do not use encryption. In addition the invention can be practiced with other authentication schemes, whether now known or later invented, that prevent undetected tampering with the original image.

In addition to encryption to prevent tampering, in a preferred embodiment the images are stored in a compound document making it very difficult for a would be forger to access the images directly using third party software.

After the digital image is received by the computer, software on the computer converts the image data into alpha-numeric strings 106. Software routines such as optical recognition (OCR) and image character recognition (ICR) for handwriting recognition are well known in the industry and will not be further described herein. The invention is meant to incorporate all such methods of converting images to alpha-numeric data whether now known or hereinafter invented and the terms OCR and character recognition as used herein are meant to include ICR and any other such conversion methods.

The process of converting the image into alpha-numeric data may also include image enhancement techniques. Where the receipt may be blurry or crumpled or otherwise imperfect, or the resolution of the input device is relatively low, such preprocessing of the image may be necessary in order to successfully convert it to alpha-numeric data. Techniques such as noise filtering, contrast enhancement, edge filtering, sharpening, as well as many others are well known within the optical imaging filed of art and will not be described in detail here. The invention is meant to embody all such types of image filtering and preprocessing whether now known or hereinafter invented. The inventors have found that commercially available libraries such as Scansoft, Abby Fine Reader and Transym OCR were useful in the process of filtering the images and converting the image to text. These packages include routines for autocropping, despeckling and deskewing which the inventors found useful in practicing the invention.

In the preferred embodiment the OCR/ICR process also preserve some of the spatial information with respect to where the text is on the receipt. This may be helpful in the next step of parsing the alpha-numeric text in order to find expense receipt information.

The next step is parsing 107-110, which involves analyzing the alpha-numerical text to find meaningful terms and values. The parsing identifies certain text as the date and amount of the receipt, it will also look for the vendor name. If the receipt has multiple charges on it, in the preferred embodiment, the parsing software will recognize the various amounts on the receipt and identify the charges associated with those amounts. Thus, for example, on a hotel bill, the parsing software may be able to identify separately the charges for room, charges for meals, telephone calls and movies. While not a required part of invention, this separating of receipts is beneficial in that many receipts carry charges that must be sub-categorized. For example, movie charges may not be reimbursable or, on a restaurant bill, alcohol charges may not be tax deductible.

Because most receipts possess similar information, the software utilizes a list of common terms to search for within the receipt text 110. For example, the software performs a search within the receipt text for terms such as "amount", "total amount" and/or "amount due." It also searches for known date formats. The software also utilizes a static and non-static database of popular vendors to facilitate the filing of the expense description category in the expense report 109. For example, if the receipt reads McDonalds, the software recognizes that McDonalds is a restaurant and automatically selects meals from the expense description category in the expense report. The database may be updated by the system provider or corporate sponsor via an convenient update medium such as a CD, ftp download or via the Internet. The static and non-static databases may be a single database.

Figure 3:
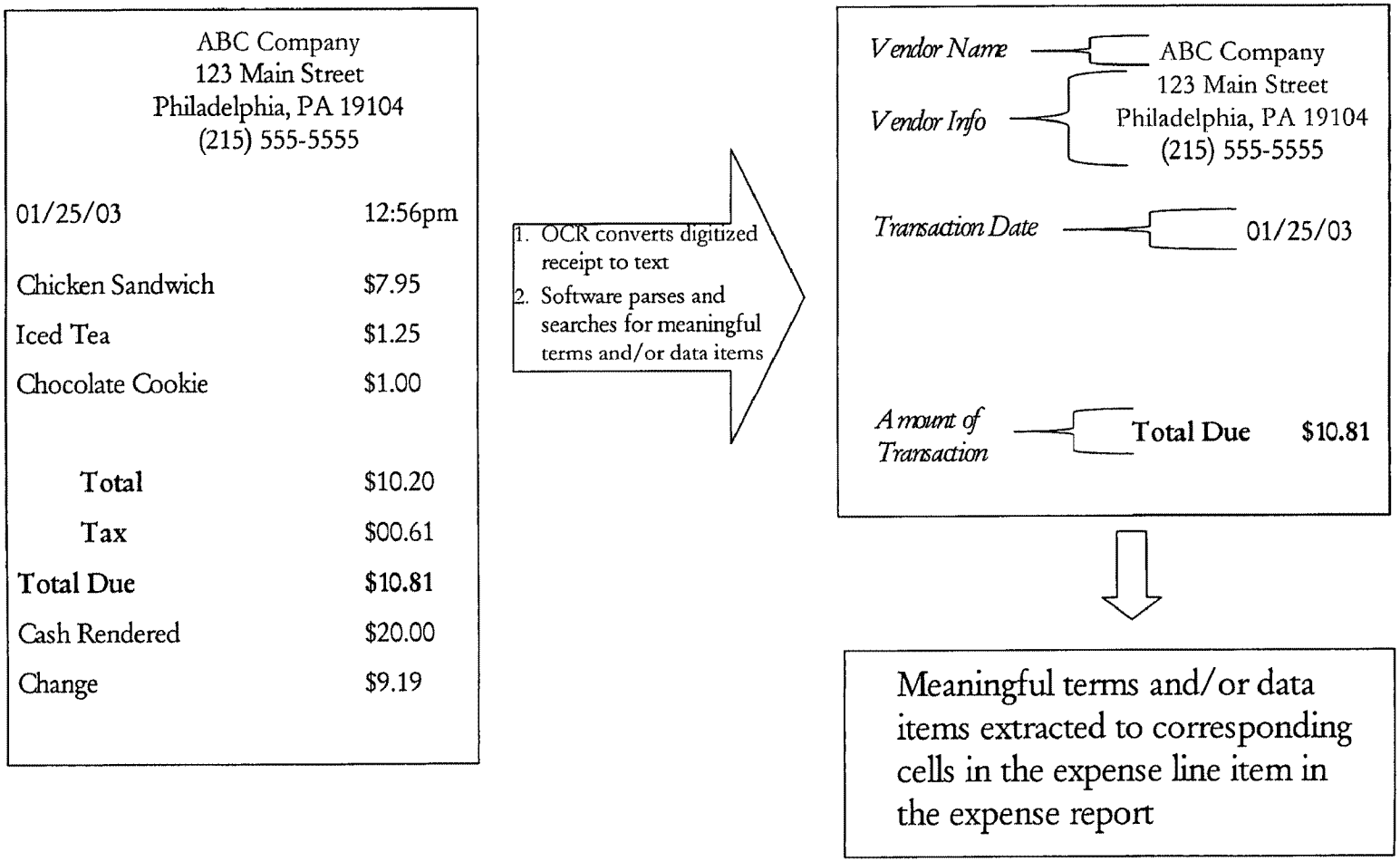
FIG. 3 is a detailed example of the typical information found on a receipt, and the present invention's ability to parse and search information stored in the digitized receipt image.

FIG. 3 shows a typical receipt and the type of expense data that may be extracted from it to form an expense line item.

Once the software locates the terms within the receipt text, the corresponding dollar amount or other relevant data (date, location, etc) is extracted it is placed into the appropriate expense report line item category 111. The receipt information extracted from the image is referred to herein as "expense data". After the receipt is correlated to an expense line item in the expense report, the software may learn the receipt structure so the next time a receipt from the same vendor is scanned into the system, the software recognizes the data structure and allocates the information appropriately to the expense report.

In one preferred embodiment, the software can learn the receipt structure for particular vendors, either by use of commercially available forms software or by remembering the structure of the data once it is parsed and/or corrected by the user.

An expense report is created from the extracted expense date by correlating each expense line item with an appropriate expense report to build the expense report 112. To facilitate this process, the software utilizes a number of different rules to sort and organize the expense report. For example, because the structure of a business trip is routine and consistent, the software will sort expense line items according to their placement in a business trip. A meal eaten in the user's home city will either come at the very beginning or the very end of a trip, as opposed to a meal eaten in a different city which would tend to occur in the middle of a trip. The user may edit, store and manage the expense report either from a CPU, PDA or the Internet. The information can also be imported into other popular expense software such as Quicken and MS Money 113 or other financial package, and can be customized to interact with specific corporate systems 117. The user can also insert expenses that have do not have a receipt associated with them.

Figure 2:
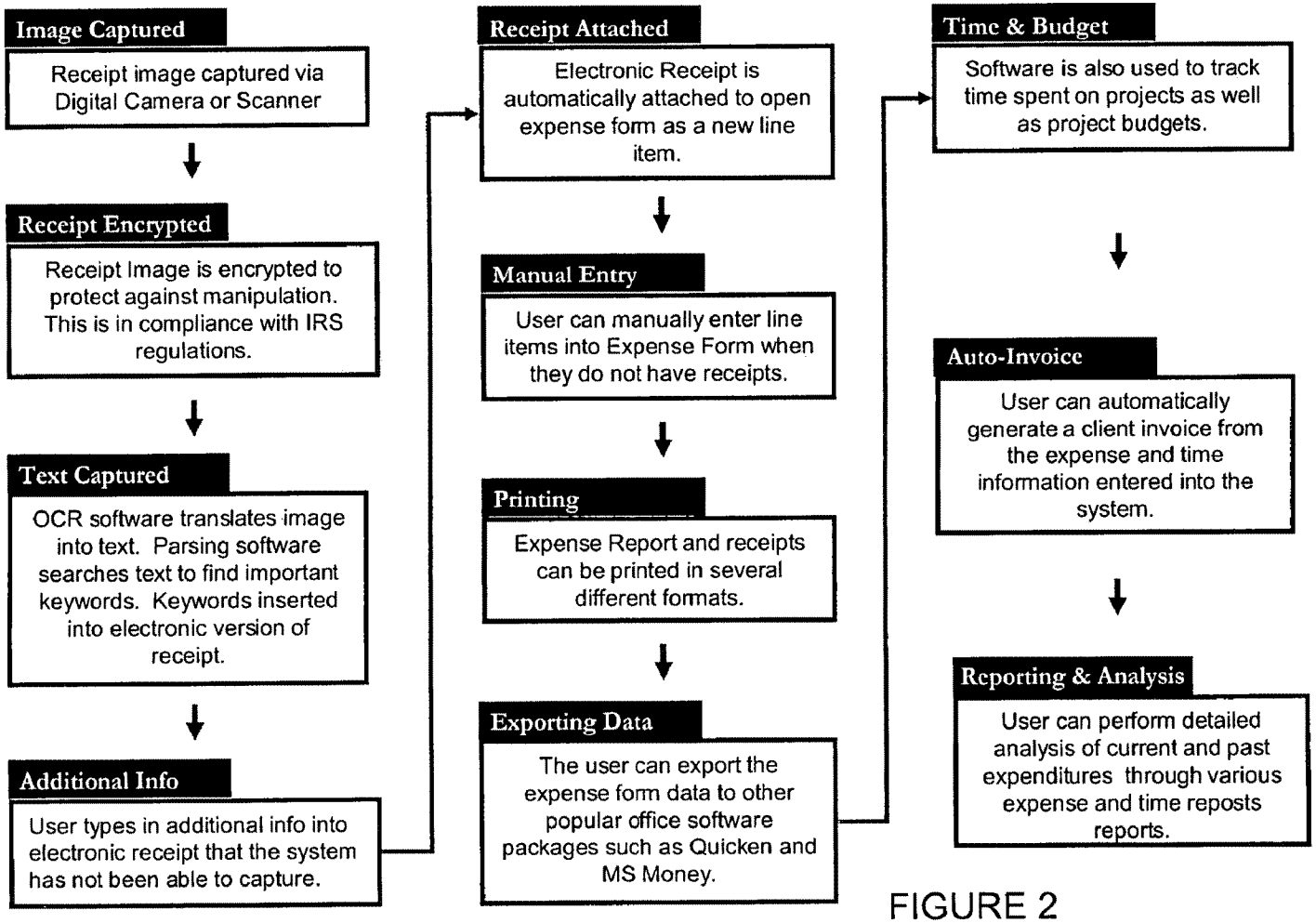
FIG. 2 is a functional block diagram illustrating a preferred flow of user operation of the present invention.

FIG. 2 is a similar flow chart to FIG. 1 except from the perspective of the user. The flow chart is self explanatory in light of the description above of FIG. 1 and will not be further described herein.

Figure 4:
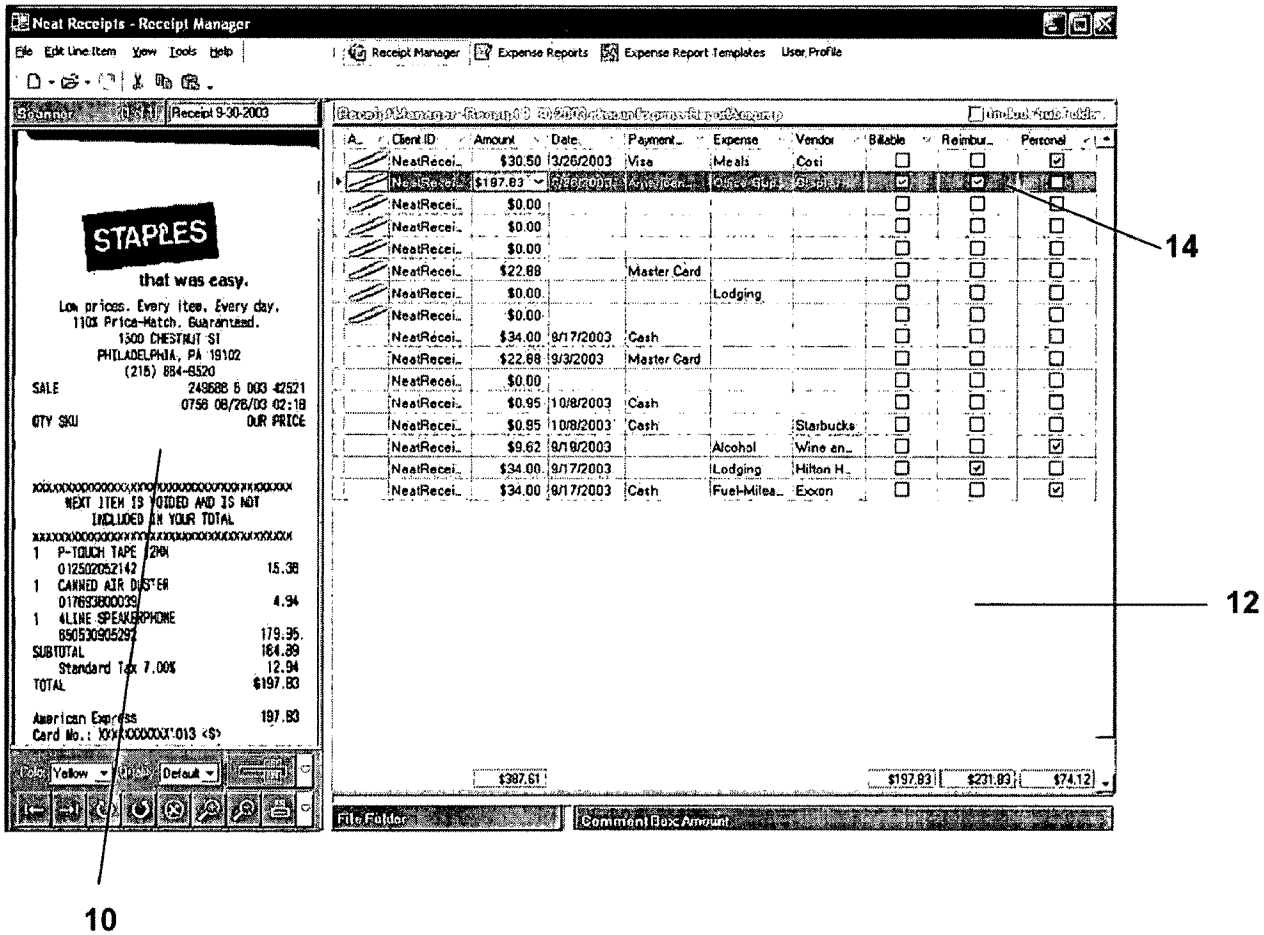
FIG. 4 a screen shot of an embodiment of the invention showing a list of receipts and a receipt image side by side.

Expense data can be presented in a number of ways. In one embodiment all receipts scanned in are listed and can be sorted by various fields. Preferably the list of receipts can by subcategorized by folders. As shown in FIG. 4, a list of receipts 12 is shown on the right of the screen. The user can scroll through the list 12, and for the highlighted item 14, the image of the corresponding receipt image 10 is shown on the left half of the screen. If a new receipt is scanned in, its image is shown on the left panel 10, and a new line item, with the corresponding expense data is filled in on the right panel 12. The user can then easily correct data or enter missing data for each receipt.

Figure 5:
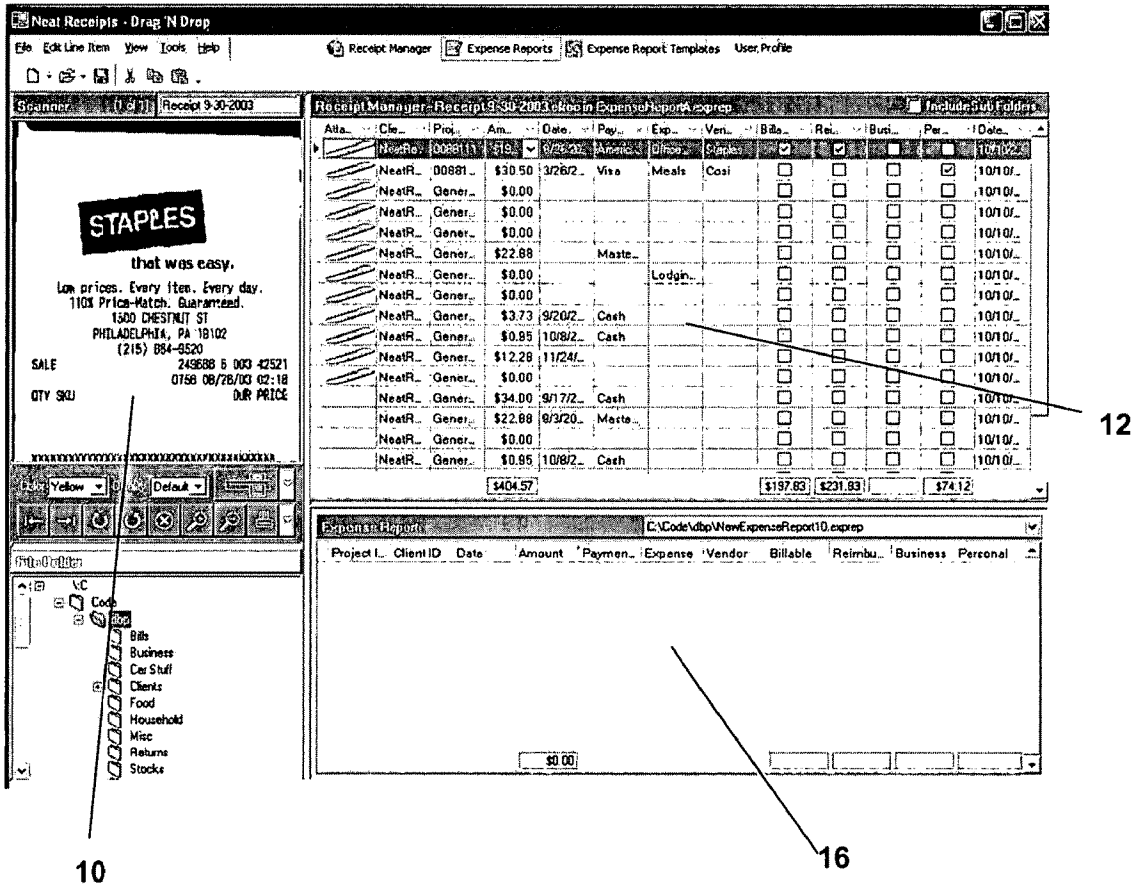
FIG. 5 is a screen shot of an embodiment of the invention showing a list of receipts, receipt image and an expense report in one screen.

FIG. 5 shows another view presented in the software embodying the invention. In this preferred embodiment, the list of receipts is shown in the top right panel 12, and a particular expense report is shown in the bottom right panel 16. A user can simply pick receipts from the list 12 and drag and drop them (or cut and paste, or check, or any other means of designation) using a mouse to the expense report 16. Additional items for which there are no receipts can also be entered into the expense report. When that expense report 16 is complete, it can be saved and a new expense report opened. Again as line items in the list of receipts 12 or in the expense report 16 are highlighted, the corresponding receipt image 10 is shown in the top left panel.

Figure 6:
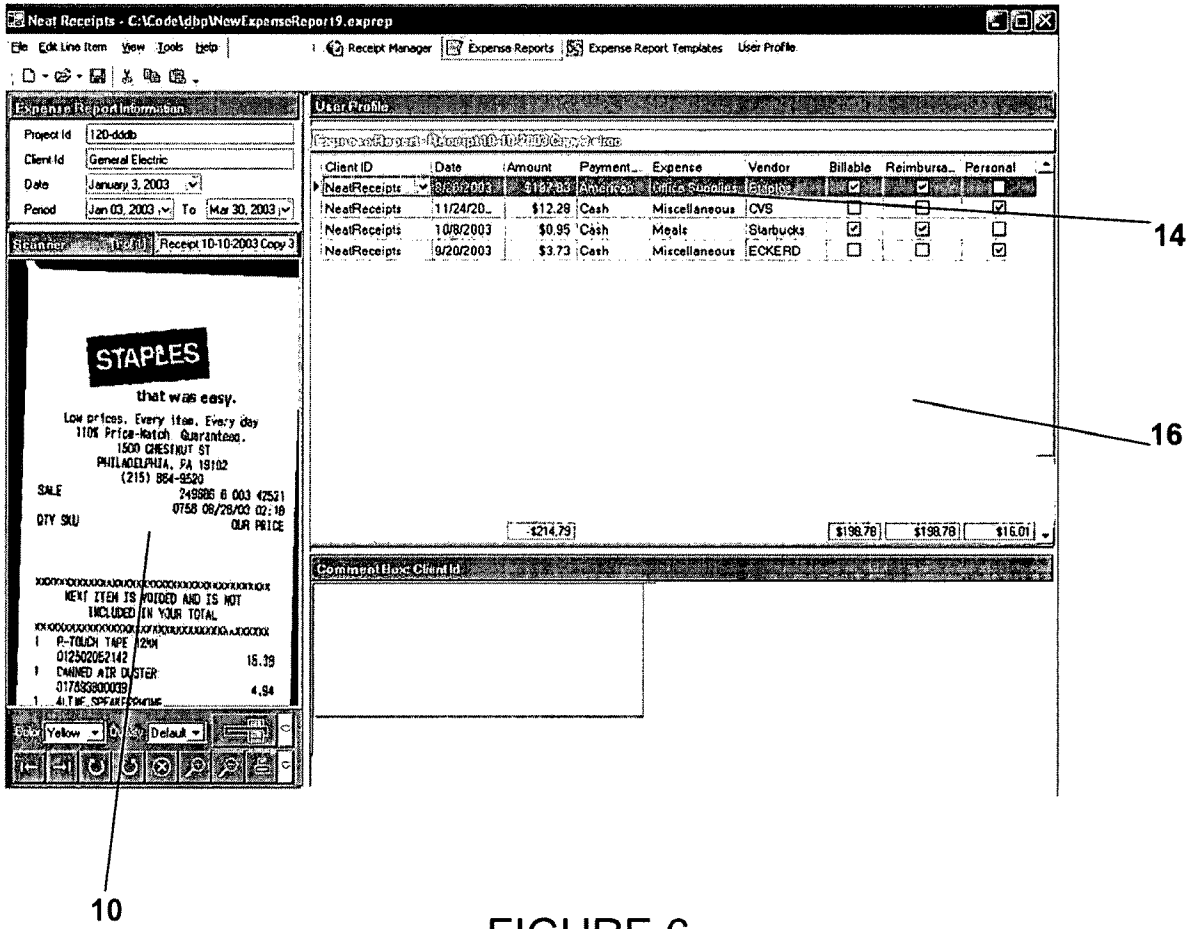
FIG. 6 is a screen shot of an embodiment of the invention showing an expense report and a receipt image side by side.

FIG. 6 shows another way to operate the system. In this view, the user sees the expense report 16 on the right panel. Now as items are scanned in they are immediately associated with the open expense report, the receipt image 10 is shown on the left and the expense data associated with that image shows up as a new line item 14 directly in the expense report 16.

The software and views described in the previous three paragraphs are shown merely as an exemplary embodiment and are not meant to in any way limit the scope of the invention.

Receipts can be correlated with particular expense reports either manually or the software can correlate the receipts to expense reports automatically. For instance, the software may assume that all the expense receipts for contiguous period of days for a single user will be on the same expense report. The user can then call up receipts from an expense report and see the users receipts associated with those expense reports. As discussed above, in the preferred embodiment of the expense report and the receipts are placed side by side on the user's display terminal, thus making it easier for the user to check the expense report. The user can then correct and edit the expense report and/or correlate a receipt with a different expense report. If the parsing routine has been unable to resolve certain information it maybe highlighted in the expense report or simply not appear there. Potentially the parsing software may have made mistakes, such as putting a charge to the wrong type of expense. The user can edit the expense report where this information is stored. In the preferred embodiment of the viewing software the user can click on an expense and automatically be taken in to an image of the associated expense receipt.

In one embodiment of the invention the software is capable of correctly orientating the image of the receipt so that it is displayed correctly (that is, not upside down or sideways) regardless of how the receipt is scanned in. In one simple algorithm, the software simply orients the receipt so that the longest side is top to bottom. This can be implemented by rotating the image 90 degrees in the width of the image as scanned is longer than its height. A more complex algorithm, yet more accurate, can use the OCR data to figure out which way the receipt is correctly oriented.

Additional information may also be added to the expense report through electronic means for instance credit card transactions maybe downloaded into the expense report, and users may not be required to keep physical paper receipts for such transactions or the credit card transactions can be reconciled on the expense report against the expenses found on the receipts. Other types of electronic payments such as debit cards can be handled in a similar fashion. In addition, users may add additional expenses for which they have no receipts, such as car mileage and tips.

Given sufficient computational power and a screen the process of the user reconciling the expense report can be done in transit. Most readily this is done today using a laptop computer connected to the input device. The software for parsing the images and sorting the expense reports can be loaded on the laptop and the user can reconcile the expense reports while on an airplane or in his or her hotel room. As hand held devices become more capable both in terms of computational power and screen resolution this process could all be handled by a single hand-held device with the images and the reconciled expense report being uploaded from the hand-held device (either wirelessly or through a wired connection) after the expense report reconciliation has been completed by the user.

Alternatively, in a web based system the user can upload the scanned images to an internet website and access the images and expense report software via a browser or proprietary software application. This would reduce the amount of storage and computational power required by the user's local computer, as well as reduce opportunities for tampering.

In another preferred aspect of the invention the system also checks for duplicate receipts entered either by mistake or for purposes of fraud. This can be done with relatively simple algorithms such as searching for identical amounts from the same vendor on the same day. More complex algorithms can actually compare images although this is difficult because the same receipt can be scanned with different orientations resulting in different images. However, within the art of image recognition there are known techniques for comparing images for similarity and the invention is meant to incorporate such techniques and others hereinafter invented.

The invention may also include an expense rule checking module which applies rules to expenses. For instance, if travel is only reimbursed up to a certain amount per day, the software can check that the submitted receipts don't exceed that amount.

Returning to the task of parsing the text data, the software searches for key words and/or structures in the alpha numeric text data abstracted from the digitized receipt image. For example, most receipts share similar date structure that allows the software to recognize a specific sequence of numbers as the date. These key words are also known as tokens.

Once recognized, the software pulls the information from the digitized receipt and allocates it to the appropriate expense line item category.

In a preferred embodiment, the software learns to recognize a receipts structure after an initial scan into the system. The software learns the particular structure of a receipt after its been scanned into the system and information has been correlated to the receipt via an expense line item.

Preferably, the database of key terms/tokens can be updated (i.e. a non-static database) by the vendor, user or the software. If the parsing software cannot find a vendor on a receipt, but the user enters the vendor name, such as "Acme Co.", then "Acme Co." can be added to the database. Assuming the user also fills in an expense category for the receipt, such as "Road Runner Extermination", then the database can also associate that vendor name with that expense category. In this way, the next time an expense receipt is scanned form "Acme Co." the software will recognize the name in the receipt as a vendor name, extract it and fill in the expense data with "Vendor: Acme Co., Category: Road Runner Extermination."

The software may also use specific sets of rules to prompt the user for additional information. The software recognizes a particular expense as requiring additional information to be entered into the appropriate expense line item in the expense report.

In one embodiment, the user can manually write a number or text in a particular region of the paper receipt that signals the software when the receipt is scanned, to automatically fill out particular expense line item categories in the expense report. Likewise, the user may manually circle discreet components on the physical receipt, such as date, amount, location, etc, which signals the software to pay particular attention to that area. This will enable the software to weed out irrelevant terms that may otherwise confuse the parsing and searching functionality.

An exemplary set of parsing rules is set forth below in Table 1. This set of parsing rules is in no way meant to limit the scope of the invention, but is meant to demonstrate one embodiment which the inventors have found to be of use in practicing that inventing the use of color is these rules is not meant to require color scanning, and the invention may be practiced using gray scale or black and white imaging.

TABLE A

| Exemplary Parsing Rules |
|---|
| Date |
| 1. If a receipt is yellow, look for a date identifier string in the upper third of the document. The information that immediately follows this string should be the receipt date. So far, the only date identifier string observed for yellow receipts is 'Date'<br>2. If a receipt is yellow and a date identifier cannot be found, search the upper half of the receipt for strings matching the date formats in this order:<br>MM/DD/YY (Look for the two/characters)<br>MMM DD, YY (Look for the abbreviated months)<br>MMMDD'YY<br>MMM DD, YYYY<br>Month DD, YYYY (Look for the full length month)<br>3. If a receipt is yellow and the date cannot be identified by format, it may be found by working backwards from the time, which often follows date. We can identifytime by searching for the formats listed below and moving backward. We may encounter a time identifier string, or we may encounter the date. If we see the identifier string, continue moving backwards and the next text item may be the date.<br>Time Formats, in order of frequency:<br>HH:MMPM, HH:MM PM, HH:MM:SS, HH:MM:SS PM, HH:MM<br>Time Identifier String (only one observed): Time<br>4. If a receipt is white, search the top quarter of the receipt for a date identifier string. If it is found, the text immediately following should be reported as the date. However, we will expect this to fail more often than not. The most common date identifier string for white receipts was 'Date'<br>5. If a date identifier string cannont be found, look for the DD/MM/YY date construction in the entire receipt. This was the single most common date format for white receipts. We should rely primarily on the two/characters for identification; some receipts drop the leading 0.<br>6. Time information very frequently follows immediately after date information on white receipts. Our second method of date location should be working backwards from the timestamp. In many cases, the information immediately preceding the timestamp can be reported as date.<br>Time formats, in order of frequency:<br>HH:MM PM, HH:MM, HH:MMPM, HH:MM:SS, HH:MMP<br>7. If we cannot find a date using the DD/MM/YY format or via time, we should look for that information matching the following forms:<br>MMMDD'YY, MM-DD-YY, MMM DD, YY and MMM DD, YYYY |
| Vendor |
| No broadly reliable method exists for identifying vendor information on the receipt. The following two rules may fail frequently, but may also provide useful information.<br>1. The vendor name may be reported as the first string of letters on the receipt. This is far from reliable, though.<br>2. Since the vendor information often includes address, we can look for a state abbreviation followed by a 5 digit number (ZIP code) and report<br>the vendor information as the text that precedes those. We'd have to account for city, street address, and vendor name, so including at least the previous 6 discrete strings would seem prudent. |
| Total |
| Tip or Non-Tip Structure |
| 1. We will first attempt to classify receipts as having a tip structure or non-tip structure by searching for positive evidence of a tip identifier. This would be the presence of any one of the following strings:<br>Tip, Tip Amount, Gratuity, Gratuity Amount<br>If one of these strings is found, we will assume the receipt is a tip structure receipt.<br>2. If the first classification rule fails, we will attempt to find evidence that the receipt is a standard, non-tip structure. This can be established by the presence of a tax line on the receipt. Tax lines will include strings as follows:<br>Tax, Sales Tax, (State Abbreviation, i.e. PA) Tax, (State Abbreviation) Sales Tax<br>If one of these strings can be found, then we can assume that the receipt is a non-tip structure.<br>3. If neither of these rules can be successfully applied, the receipt should be treated as a non-tip structure. |
| Payment Method |
| 1. We can determine payment method positively by searching for certain strings in the receipt.<br>2. A receipt will be treated as a credit card receipt if we can identify one of the following strings:<br>MASTERCARD, MC, VISA, AMEX, CREDIT<br>3. A receipt will be treated as a credit card receipt if we can find evidence for an expiration date field by identifying one of the following strings:<br>EXP, EXP DATE<br>4. A receipt will be treated as a credit card receipt if we can find evidence of a credit card account numver in one of the following formats:<br>XXXXXXXXXXXX1234, 1234 1234 1234 1234, XXXX XXXX XXXX 1234<br>5. A receipt will be treated as a cash receipt if we can find the string 'CASH' in the lower third of the receipt.<br>6. If none of the above rules can be successfully applied and the receipt is yellow, we will treat it as a credit card receipt.<br>7. If none of the above rules can be successfully applied and the receipt is white, we will treat the receipt as a cash receipt. |
| Total Amount (Tip Receipts) |
| 1. We will first attempt to find a total amount by searching for tip receipt total identifier strings in the lower half of the receipt. The dollar amount immediately following these strings will be treated as the subtotal, and either a flat 15% rate or a configurable tip function will be applied to it<br>The following strings are valid total identifiers: Subtotal, Base, Amount, Pre-Tip Amount<br>2. If we are unable to find a total amount identifier, we can assume that in a tip structure receipt, the subtotal amount number will be the highest readable dollar amount on the receipt. |
| Total amount (Non-Tip Receipts) |
| 1. We will first look for the total on a non-tip receipt by looking for a total identifier string and assuming that the number that immediately follows such a string is the appropriate total amount.<br>Valid total identifier strings are: Total, Sale Total, Sale<br>2. If a valid total identifier string cannot be found and the payment method rules above show that the receipt is a credit card sale, the total amount will be the highest number on the receipt.<br>3. If a valid total identifier cannot be found and the receipt is a cash receipt, then it is necessary to look for a change identifier and change amount. A change amount immediately follows a change identifier.<br>Valid change identifiers are: Change, Change Due<br>4. If the change amount is non-zero, then we will take the second highest dollar amount on the lower half of the receipt as the total.<br>5. If the change amount is zero, then we will take the highest dollar amount on the lower half of the receipt as the total.<br>6. If the change amount cannot be identified, we will look for a repeating amount. This we can assume is total and tender in an exact change situation, and should also be the last two dollar amounts on the receipt.<br>7. If neither a change amount nor a repeating amount can be identified, we can assume that we have an inexact change receipt. We should then report the second highest identifiable dollar amount as the total. |

End of TABLE 1

As previously mentioned, in one preferred embodiment receipts are stored and processed remotely via the Internet, an intranet, or other network. Such a network serves several main purposes: 1) ensures that the receipts have not been manipulated or altered, thereby ensuring their legitimacy; 2) stores and organizes the receipts by individual user and/or an organization; 3) mirrors functionality that a local client provides the user on the network; and 4) allows expense reports and images to be electronically and easily routed to multiple individuals. The receipt account on the Internet (ASP) provides the individual user with a number of benefits. It serves as a verification source that the receipt has not been manipulated or altered in any way. This is important to the IRS and Employers. Users may access their account through the Internet and view and create receipt expense reports, as opposed to just being able to view or create receipt expense reports with their software enabled computer processor.

Organizations also benefit from the system. If an entire organization uses the receipt system, then the organization can integrate their expense reports into the accounts payable program of an accounting system. Approvals can be granted, checks cut and mailed, and notifications provided to the expense submitter.

It is understood that the invention is not limited to the disclosed embodiments, but on the contrary, is intended to cover various modifications and equivalent arrangements included within the spirit and scope of the appended claims. Without further elaboration, the foregoing will so fully illustrate the invention, that others may by current or future knowledge, readily adapt the same for use under the various conditions of service.

What is claimed:

1. A method for processing a paper expense receipt using a computer system comprising the steps of:
- receiving at a computer input device the paper expense receipt from an individual incurring an expense;
- receiving on a computer processor an electronic image of the expense receipt from the computer input device;
- processing the electronic image to automatically obtain expense data by:
  - using character recognition software to obtain text data from the electronic image; and
  - parsing the text data to determine the expense data position within the text data; and
- populating an electronic expense report with the expense data; and
- displaying the electronic expense report to the individual;
- wherein the position of the expense data on the expense receipt is not predefined for the computer system.

2. The method of claim 1 wherein the computer input device is a portable scanner, digital camera, facsimile machine, personal digital assistant camera, telephone camera or communicator camera.

[3. The method of claim 1 wherein the step of processing the electronic image is further comprised of the steps of:
- using character recognition software to obtain text data from the electronic image;
- parsing the text data to search for expense data.]

4. The method of claim 1 wherein the expense data is date of expense, expense amount, vendor name, payment method or vendor address.

5. The method of claim 1 further comprising the steps of:
- receiving additional data;
- modifying the electronic expense report with the additional data;
- displaying the modified electronic expense report to the individual; and
- storing the modified expense report in non-volatile memory.

6. The method of claim 1 further comprising the step of encrypting the electronic image.

7. The method of claim 1 further comprising the step of encrypting the expense report.

8. The method of claim 1 wherein the computer applies a set of expense rules to the expense data.

9. The method of claim 1 wherein the expense report and receipt image are displayed simultaneously.

10. The method of claim 1 wherein the expense report, a list of scanned receipts, and receipt image are displayed simultaneously.

11. The method of claim 1 further comprising the step of checking for duplicate receipts.

12. A computer readable medium containing instructions for controlling a computer system to perform a method for storing a paper expense receipt comprising the steps of:
- receiving at a computer input device the paper expense receipt from an individual incurring an expense;
- receiving on a computer processor an electronic image of the expense receipt;
- processing the electronic image to automatically obtain expense data by:
  - using character recognition software to obtain text data from the electronic image; and
  - parsing the text data to determine the expense data position within the text data; and
- populating an electronic expense report with the expense data; and
- displaying the electronic expense report to the individual;
- wherein the position of the expense data on the expense receipt is not predefined for the computer system.

13. The computer readable medium of claim 12 wherein the computer input device is a portable scanner, digital camera, facsimile machine, personal digital assistant camera, telephone camera or communicator camera.

[14. The computer readable medium of claim 12 wherein the step of processing the electronic image is further comprised of the steps of:
- using character recognition software to obtain text data from the electronic image;
- parsing the text data to search for expense data.]

15. The computer readable medium of claim 12 wherein the expense data is comprised of date of expense, expense amount, vendor name, payment method or vendor address.

16. The computer readable medium of claim 12 wherein the method further comprises the steps of:
- receiving additional data;
- modifying the electronic expense report with the additional data;
- displaying the modified electronic expense report to the individual; and
- storing the modified expense report in non-volatile memory.

17. The computer readable medium of claim 12 further comprising the step of encrypting the electronic image.

18. The computer readable medium of claim 12 further comprising the step of encrypting the expense report.

19. The computer readable medium of claim 12 wherein the computer applies a set of expense rules to the expense data.

20. The computer readable medium of claim 12 wherein the expense report and receipt image are displayed simultaneously.

21. The computer readable medium of claim 12 wherein the expense report, a list of scanned receipts, and receipt image are displayed simultaneously.

22. The computer readable medium of claim 12 wherein the method is further comprised of the step of checking for duplicate receipts.

[23. A computer system for processing a paper expense receipt comprised of:
- a computer input device for receiving the paper expense receipt from an individual incurring an expense, and creating an electronic image of the receipt;

a computer processor in communication with the computer input device;

a software module operating on the computer processor processing the electronic image to obtain expense data by;

applying character recognition techniques to obtain text data from the electronic image; and parsing the text data to determine the expense data position within the text data; and a display in communication with the computer on which the expense receipt is displayed to the individual;

wherein the position of the expense data on the expense receipt is not predefined for the computer system.]

[24. The system of claim 23 wherein the computer input device is a scanner, digital camera, facsimile machine, personal digital assistant camera, telephone camera or communicator camera.]

[25. The system of claim 23 wherein the software module for processing the electronic image is further comprised of:

a character recognition software module to obtain text data from the electronic image;

a parsing software module for parsing the text data to search for expense data.]

[26. The system of claim 23 wherein the expense data is comprised of date of expense, expense amount, vendor name, payment method or vendor address.]

[27. The system of claim 23 further comprising a second input device for receiving additional data to modify the expense report.]

[28. The system of claim 23 further comprising a software module operating on the computer processor for encrypting the electronic image.]

[29. The system of claim 23 further comprising a software module for applying a set of expense rules to the expense data and expense report.]

[30. The system of claim 23 wherein the expense report and receipt image are displayed simultaneously.]

[31. The system of claim 23 wherein the expense report, a list of scanned receipts, and receipt image are displayed simultaneously.]

[32. The system of claim 23 further comprising software module to check for duplicate receipts.]

*33. A computer system for processing a paper expense receipt comprised of:*

*a computer input device for receiving the paper expense receipt from an individual incurring an expense, and creating an electronic image of the receipt;*

*a computer processor in communication with the computer input device;*

*a software module operating on the computer processor processing the electronic image to automatically obtain expense data by:*

*applying character recognition techniques to obtain text data from the electronic image; and*

*parsing the text data to determine the expense data position within the text data; and*

*a software module operating on the computer processor filling in an expense report with the expense data; and*

*a display in communication with the computer on which the expense report is displayed to the individual;*

*wherein the position of the expense data on the expense receipt is not predefined for the computer system.*

*34. The system of claim 33 wherein the computer input device is a scanner, digital camera, facsimile machine, personal digital assistant camera, telephone camera or communicator camera.*

*35. The system of claim 33 wherein the software module for processing the electronic image is further comprised of:*

*a character recognition software module to obtain text data from the electronic image;*

*a parsing software module for parsing the text data to search for expense data.*

*36. The system of claim 33 wherein the expense data is comprised of date of expense, expense amount, vendor name, payment method or vendor address.*

*37. The system of claim 33 further comprising a second input device for receiving additional data to modify the expense report.*

*38. The system of claim 33 further comprising a software module operating on the computer processor for encrypting the electronic image.*

*39. The system of claim 33 further comprising a software module for applying a set of expense rules to the expense data and expense report.*

*40. The system of claim 33 wherein the expense report and receipt image are displayed simultaneously.*

*41. The system of claim 33 wherein the expense report, a list of scanned receipts, and receipt image are displayed simultaneously.*

*42. The system of claim 33 further comprising software module to check for duplicate receipts.*

* * * * *